(12) United States Patent
Sturm et al.

(10) Patent No.: US 8,260,128 B1
(45) Date of Patent: Sep. 4, 2012

(54) LIQUID-RESISTANT CONNECTORS AND COVERS FOR EQUIPMENT USING THE SAME

(75) Inventors: Michael Sturm, Redding, CA (US); Douglas Harland Murdoch, Santa Rosa, CA (US)

(73) Assignee: Think Tank Photo, Inc., Santa Rosa, CA (US)

( * ) Notice: Subject to any disclaimer, the term of this patent is extended or adjusted under 35 U.S.C. 154(b) by 35 days.

(21) Appl. No.: 12/885,461

(22) Filed: Sep. 18, 2010

Related U.S. Application Data

(60) Provisional application No. 61/244,396, filed on Sep. 21, 2009.

(51) Int. Cl.
  *G03B 17/08* (2006.01)
  *B65D 85/38* (2006.01)
(52) U.S. Cl. ........................ 396/27; 206/316.2
(58) Field of Classification Search .................... 396/27, 396/448; 206/316.1, 316.2
  See application file for complete search history.

(56) References Cited

U.S. PATENT DOCUMENTS

| | | | |
|---|---|---|---|
| 4,071,066 A * | 1/1978 | Schaeffer | 396/27 |
| 4,601,318 A * | 7/1986 | Diegelman | 206/316.2 |
| 4,927,017 A * | 5/1990 | Easter | 206/316.2 |
| 5,337,891 A * | 8/1994 | Toth | 206/316.2 |
| 6,349,180 B1* | 2/2002 | Jabbour et al. | 396/535 |
| 7,870,962 B2* | 1/2011 | Law | 206/578 |
| 2005/0167458 A1* | 8/2005 | Weiss | 224/250 |
| 2006/0096874 A1* | 5/2006 | Doran | 206/316.2 |
| 2008/0247750 A1* | 10/2008 | Law et al. | 396/535 |
| 2010/0065453 A1* | 3/2010 | Murdoch et al. | 206/316.2 |
| 2010/0147715 A1* | 6/2010 | Miglioli et al. | 206/316.2 |

* cited by examiner

*Primary Examiner* — Christopher Mahoney
(74) *Attorney, Agent, or Firm* — R. Dabney Eastham

(57) ABSTRACT

A water-resistant connector for use with fabric and sheet-like material comprises two plates stitched to each other on either side of and through the fabric or sheet-like material with at least one gasket made of an elastomeric material such as neoprene being placed between one of the plates and the fabric or sheet-like material. The gasket is stitched through and compressed between the plates so as to press against the stitching for water resistance. A suitable elastomeric material is a sheet of elastomeric compound adhered to either side of a reinforcing scrim. A rain cover for a camera and lens includes a water-resistant connector attached on the outside to a neck strap and on the inside to a strap system secured to the camera and lens whereby the camera and lens can be supported by the neck strap when the rain cover is protecting the camera and lens. A gasket may be provided encircling an eyepiece of the camera.

13 Claims, 13 Drawing Sheets

LIQUID-RESISTANT CONNECTORS AND COVERS FOR EQUIPMENT USING THE SAME

CROSS-REFERENCE TO RELATED APPLICATIONS

This application claims the benefit of U.S. provisional patent application Ser. No. 61/244,396, filed on Sep. 21, 2009 for "Liquid-Resistant Connectors and Covers for Equipment Using the Same," by Douglas Harland Murdoch and Michael Sturm, the disclosure of which is incorporated herein by reference.

STATEMENT REGARDING FEDERALLY SPONSORED RESEARCH OR DEVELOPMENT

Not applicable.

BACKGROUND

1. Field of Invention

The field of the invention relates to connectors.

2. Discussion

Connections must sometimes be made to water-resistant or waterproof sheeting without defeating the water-resistant or waterproof quality of that sheeting. For example, a waterproof bag intended for use in white water rafting may have to be connected to a shoulder strap or a handle. A tent fly may need to be connected to a line to secure the tent against wind. The means by which the connection is made should not lead to openings in the sheeting that will cause leaks when exposed to moisture. This could happen if the connection is sewn to the sheeting because the stitching will penetrate the water-resistant or waterproof sheeting. It may be possible to avoid the use of stitching by welding or gluing the connector to the sheeting. Stitching, however, is most commonly used because it is easier to use, is well known, does not require expensive welding equipment, is strong, and is reliable.

Hitherto, connections to water-resistant or waterproof sheeting utilizing stitching have been secured against moisture by applying a water-resistant tape over the stitching or by applying a sealant to the stitching, in the same manners as seams are sealed. This is a laborious and sometimes uncertain solution. It may be difficult or impossible to seal stitching in certain cases by using these means.

An example of a connection that is difficult to seal using conventional means is one that would permit a shoulder or neck strap to be used with a rain cover for a camera and lens. Some current rain covers pass the shoulder strap through openings in the rain cover to anchor points on the camera body or lens. This makes a breach in the barrier against moisture provided by the rain cover.

Preferably, the strap would be connected to the rain cover and the rain cover would be connected to a supporting strap that would support the camera and lens.

Attaching the shoulder or neck strap to a connection point on the outside of the rain cover, and the supporting strap to a connection point on the inside of the rain cover, would permit the shoulder or neck strap to support the camera and lens through the rain cover without permitting moisture to pass through the connection area. This kind of a connection has not been accomplished because of the difficulty of providing connection points that both would be able to support the weight of a camera and lens, which can be considerable for a digital single lens reflex camera and a large lens, such as a 70-200 telephoto lens, and would be waterproof or at least water-resistant. The difficulty is increased by the presence of connection points on both sides of the fabric.

SUMMARY

A stitched connector to a sheet-like material that resists the passage of a liquid, such as waterproof fabric, is provided that will also resist the passage of the liquid. In an embodiment of the connector, the sheet-like material is water-resistant fabric and the liquid is water.

In a preferred embodiment of the connector, a water-resistant connector comprises two plates stitched to each other through the sheet-like material, with at least one gasket made of an elastomeric material being placed between one of the plates and the sheet-like material, the gasket being stitched through and compressed by the plates so the gasket will press against the stitching and the sheet-like material. A preferred elastomeric material is a sheet of elastomeric compound adhered to either side of a reinforcing scrim. An additional gasket may be provided between the other side of the sheet-like material and the other of the plates.

In an application of the connector according to the invention, a rain cover for equipment, such as a camera and lens, includes a water-resistant connector attached on the outside to a neck or shoulder strap and on the inside to a strap system secured to the equipment, whereby the camera and lens can be supported by the neck or shoulder strap when the rain cover is protecting the equipment.

A rain cover for a camera and lens may be provided with a transparent hood for a flash unit that can be folded out of the way when the flash unit is removed from the camera. It may also be provided with a water-resistant gasket in the vicinity of the eyepiece of the camera, the gasket being made of an elastomeric material with a hole in it, wherein an elongated eyepiece may be substituted for the regular eyepiece of the camera and the elongated eyepiece may be inserted though the hole in the gasket and the gasket will seal against the eyepiece to prevent the entry of water around the eyepiece. A preferred elastomeric material for use in the eyepiece gasket is a sheet of elastomeric compound adhered to either side of a reinforcing scrim. A pocket may be provided on the rain cover for securing the elongated eyepiece when it is not in use.

These and other objectives, features, and advantages of the present invention will become apparent from the following detailed description, the accompanying drawings, and the appended claims.

DETAILED DESCRIPTION

Figure 1:
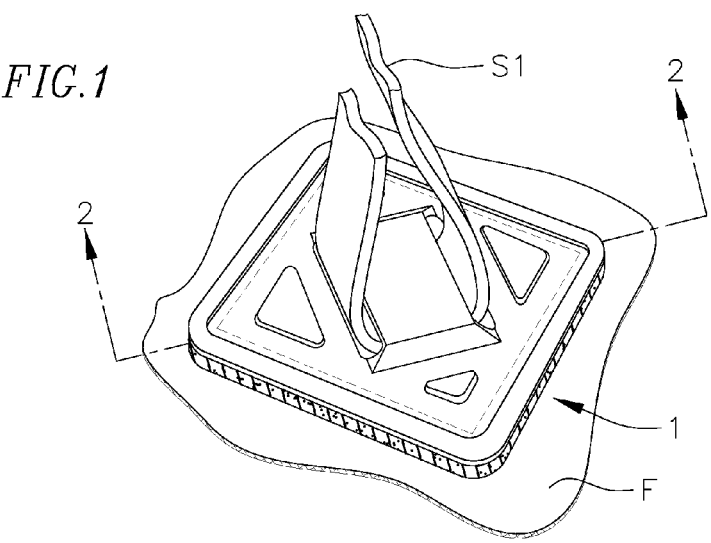
FIG. 1 is a perspective view of a liquid-resistant connection according to the invention of two lash tabs to liquid-resistant fabric sheeting.

A preferred embodiment of a connector for use with a sheet-like material that resists the passage of liquid comprises two plates stitched to each other through the sheet-like material with at least one gasket made of an elastomeric material such as polychloroprene being placed between one of the plates and the sheet-like material and being stitched through and compressed by the stitching so the gasket presses against the stitching. A suitable elastomeric material is a sheet of elastomeric compound adhered to either side of a reinforcing scrim.

A rain cover for a camera and lens may be provided that includes a water-resistant connector attached on the outside to a shoulder or neck strap and on the inside to a strap system secured to the camera and lens, whereby the camera and lens can be supported by the neck strap when the rain cover is protecting the camera and lens.

The sheet-like material may be any sheet-like material that prevents the passage of a liquid and can be stitched through. Usually the liquid is water and thus the characteristic of preventing the passage of liquid is referred to by the word "water-resistant" in this specification. The specification will refer to the liquid as being water although it will be understood that the devices and methods disclosed in this specification may be applicable in situations involving other liquids.

The quality of resisting the passage of a liquid is a relative term, especially in regard to fabrics. All fabrics may be said to resist the passage of a liquid in some degree ranging from minimal, as in the case of gauze, to completely, as in the case of the vinyl-impregnated fabrics used in inflatable rafts. "Waterproof," "water-resistant," and "water repellent" are all terms applied to fabrics having the quality of resisting the passage of a liquid such as water. Laboratory testing protocols are used to provide definitions of the "waterproofness" of fabrics in terms of hydrostatic head. One definition of "waterproof" requires a fabric to withstand the pressure of over 1,500 millimeters of water without leaking. In other words, a horizontal layer of fabric would have to withstand the pressure of 1.5 meters of water standing on it without leaking. This is not the only definition or test of water-proofness. The W.L. Gore Company, for example, tests outer garments made with GORE-TEX fabric with a "Rain Room Test" that is designed to simulate a variety of rain conditions, in which droplets of water of different sizes are projected at various speeds at the outer wear to determine whether it will leak.

This specification will use as the following as the general definition of the term "water-resistant" when applied to sheeting such as fabric or a connection to the sheeting: "will not permit the passage of water when exposed to rain for an hour or more." It will be understood that a "water-resistant" sheet-like material and connector will resist the passage of other liquids even though the definition is stated in terms of water.

The sheet-like material could be plastic sheeting or a fabric treated to resist the passage of a liquid, usually water. The connectors described below are attached to the sheet-like material by stitching. The stitching process involves the penetration of the sheet-like material by a needle in order to insert a thread or threads. This process normally reduces the capacity of the sheet-like material to resist the passage of the liquid in the vicinity of the stitching.

Figure 2:
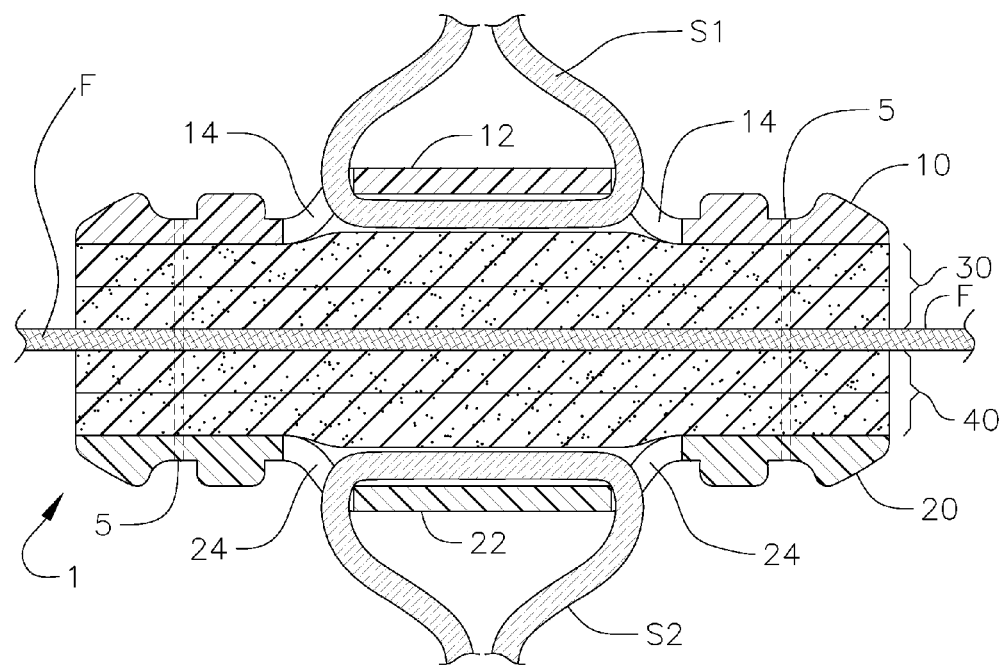
FIG. 2 is a sectional view of the connection of FIG. 1, taken along the plane 2-2 shown in FIG. 1.
Figure 3:
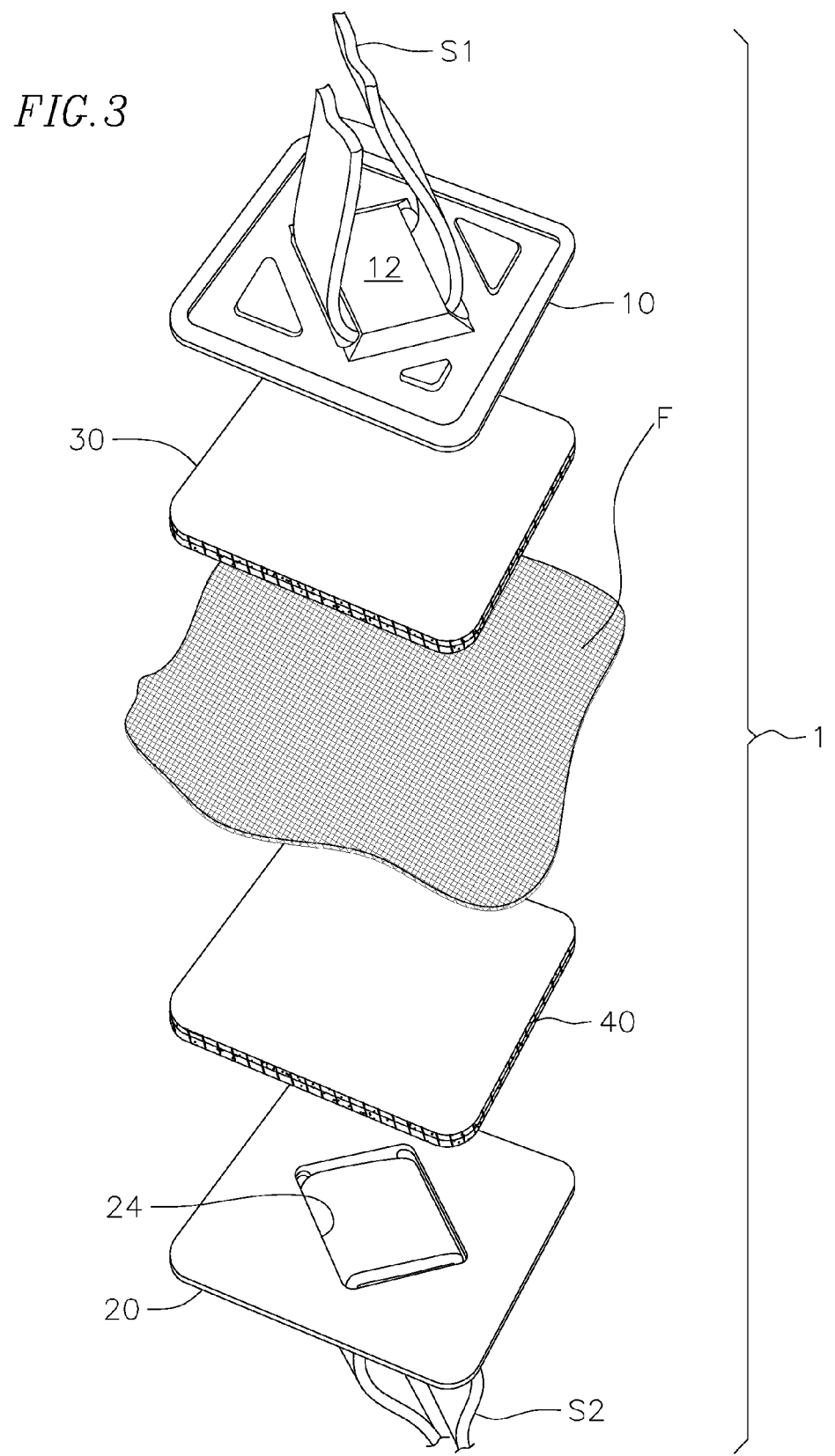
FIG. 3 is an exploded view of the connection of FIG. 1.

FIGS. 1-3 depict a connector 1 to a sheet-like material, in this case fabric F. Fabric F is water-resistant. The connector 1 comprises the plates or lash tabs 10 and 20 on either side of the fabric F. The lash tabs 10 and 20 are preferably made of a plastic material such as thermoplastic rubber and are joined by the stitching 5. The stitching 5 penetrates the water-resistant fabric F and normally would lead to leakage through the fabric F when exposed to water on one side of the fabric F.

The connector 1 would be difficult to make water-resistant using known techniques such as taping and/or applying sealant, because of the presence of the lash tabs 10 and 20 on both sides of the fabric F. It should also be noted that each of the lash tabs 10 and 20 may be attached to the straps S1 and S2, respectively. Depending on the use of the straps S1 and S2, the stitching could be placed under tension if each of the lash tabs 10 and 20 was to be placed under a load from the straps S1 and S2, respectively. The tensioning of the stitching would add to the difficulty of making the connection 1 water-resistant, because of the tendency of the lash tabs 10 and 20 to separate from the fabric F.

The connector 1 further comprises the gaskets 30 and 40. (The structure and composition of the gaskets 30 and 40 will be discussed below in connection with FIGS. 4 and 5.) The gasket 30 is placed between the lash tab 10 and the fabric F. The gasket 40 is placed between the lash tab 20 and the fabric F. The stitching 5 passes through the gaskets 30 and 40 and holds them in place along with the lash tabs 10 and 20. The stitching 5 provides a force that compresses the gaskets 30 and 40 against the fabric F and against the lash tabs 10 and 20, respectively.

Figure 4:
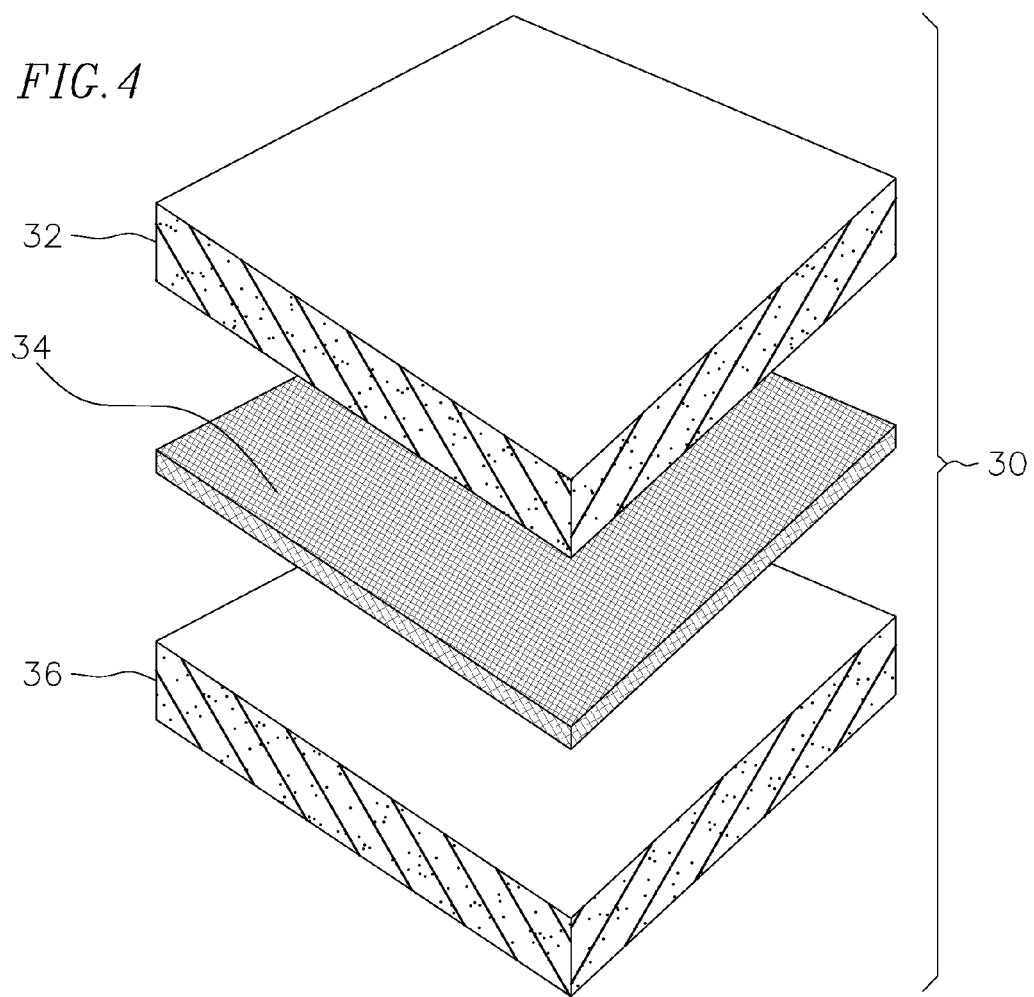
FIG. 4 is an expanded view of a preferred form of the gasket according to the invention.
Figure 5:
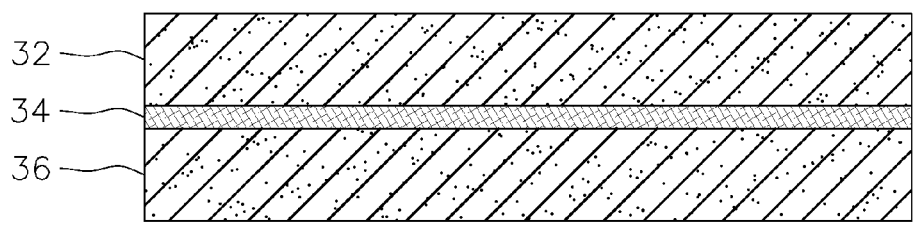
FIG. 5 is a sectional view of the gasket of FIG. 4.
Figure 6:
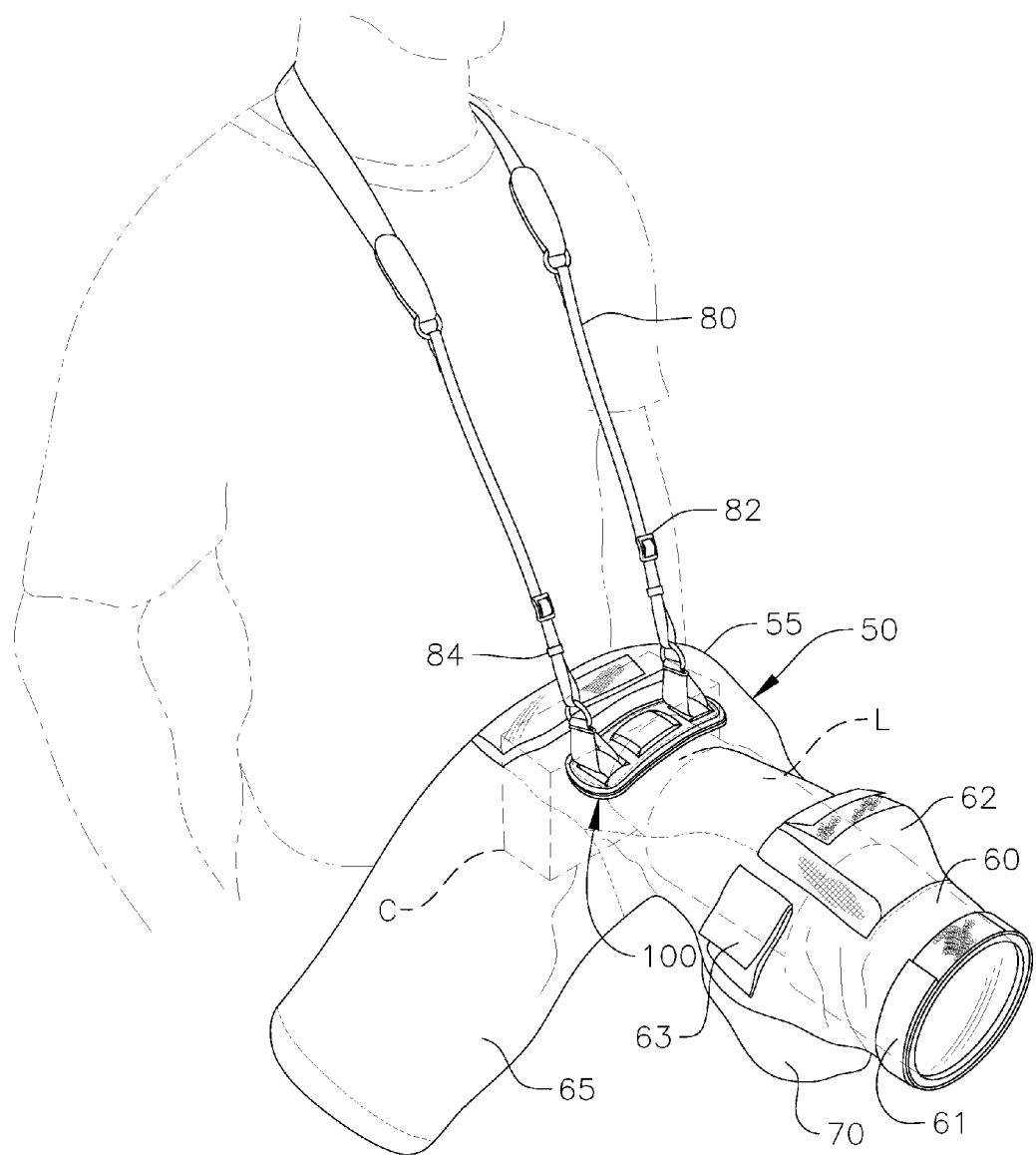
FIG. 6 is a perspective view of a rain cover for a camera and lens according to the invention that employs a water-resistant connection according to the invention to attach a shoulder or neck strap and a camera support strap to opposite sides of the same location on the rain cover.

A preferred structure of the gasket 30 is shown in FIGS. 4 and 5 (the same structure preferably is used in the gasket 40). The gasket 30 is comprised of three layers: the elastomeric layers 32 and 36 are adhered to either side of a scrim sheet 34. The elastomeric layers 32 and 36 seal around the holes in the fabric F caused by the stitching 5. The scrim sheet 34 prevents ripping of the elastomeric layers 32 and 36 during the sewing of the stitching 5 and the cutting of the gasket 30. The scrim sheet 34 preferably is a sheet made of fabric that is resistant to tearing.

A preferred material for making the elastomeric layers 32 and 36 is synthetic rubber such as polychloroprene. Neoprene is the more familiar generic term for this man-made rubber product. It is produced by DuPont Dow Elastomers LLC.

Neoprene sheeting without any scrim material attached to it is weak and easily damaged. Therefore, conventional neoprene sheeting has a scrim layer, sometimes called a backing, attached to both sides of the neoprene layer. The scrim layer or backing is typically a woven or knitted polyester or nylon fabric.

Neoprene sheeting with outer scrim layers is not preferred for use in a gasket in a connector according to the invention because the scrim layers interfere with the necessary intimate contact of the neoprene with the holes in the fabric F and the lash tabs 10 and 20 under the compression induced by the stitching 5. The three layer structure of the gasket 30 (and the gasket 40, which preferably has the same structure), in which the reinforcing scrim layer is the middle layer, was specially developed for the preferred embodiments of the connectors according to the invention. As will be seen, it has additional uses in which the sealing effect of the external layers of elastomeric material is combined with the strength provided by an internal scrim.

FIG. 3 shows how the connector 1 is assembled into the completed form shown in FIGS. 1 and 2. The stitching 5 secures the lash tab 10 and the gasket 30 to one side of the fabric F and the lash tab 20 and the gasket 40 to the opposed side of the fabric F. The lash tabs 10 and 20 are drawn toward each other by the stitching. This compresses the neoprene of the gaskets 30 and 40. The neoprene of these gaskets is elastic and, under compression, will seal around the stitching 5 where it passes through the gaskets 30 and 40 and against the holes produced by the stitching in the lash tabs 10 and 12 and the fabric F. The stitching process preferably should produce an adequate compression by setting the sewing machine to have upper and lower thread tensions in order to produce a tight stitching. No specific guidance, beyond the production of a tight stitching, can be stated because the amount of thread tension to be set will depend on the materials employed and the sewing machine employed.

In a test, a connector 1 of the form shown in FIGS. 1-3 with gaskets made as shown in FIGS. 4 and 5 was prepared. The fabric was polyurethane-coated nylon and would be considered waterproof under the 1,500 millimeters of water hydrostatic test described above. The waterproofness of the connector was tested by placing the fabric with the connector over a large bowl, the connector being centered in the bowl, and allowing the fabric to sag so that water could be poured on top of the fabric and the connector and retained there, with a hollow space between the fabric and the bottom of the bowl. The connector was under a layer of water that covered the connector. After three hours, the fabric and connector were removed from the bowl. No moisture had penetrated into the bowl below the fabric and connector and no moisture was to be observed on the fabric or connector on the side facing the bottom of the bowl.

The connector 1 may be modified in many ways in accordance with the disclosure. In general, compression supplied to an elastomeric sheet (the gasket) seals the holes produced by stitching in a sheet-like material such as a fabric. The elastomeric sheet preferably should be forced against the sheet-like material by being compressed between two plates. The plates preferably should be of a substance that is preferably less flexible than the gasket in order to resist deformation due to the tension of the stitching. The plates thus will be able to provide a substantially even compression of the gasket in the vicinity of the stitching, even though the plates may still be somewhat flexible.

The plates in the connector 1 are the lash tabs 10 and 20. It will be understood that other plates might be employed, such as one lash tab and a flat plate, disposed on opposed sides of the fabric as are the lash tabs 10 and 20 of the connector 1. Another alternative would be to provide a plate with a connection to a D-ring on one side and a featureless plate on the other. Many variations of plates are possible.

It will also be understood that the gaskets may be made of materials other than neoprene, as long as those materials have sufficient elasticity. Alternative elastomeric materials preferably should have other desirable properties, such as durability.

It is also possible to employ only one gasket, preferably but not necessarily on the weather side of the connector, rather than two, as long as sufficient compression is achieved between the plates (represented by the lash tabs 10 and 20 in the connector 1).

FIGS. 6-10 depict a rain cover 50 for photographic equipment, namely a camera C and a lens L. As shown in these drawings, the camera C is a single lens reflex camera body and the lens is a telephoto lens such as a 70-200 millimeter variable focal length lens. The rain cover 50 is designed to fit over the camera C and the lens L in order to protect them from atmospheric moisture such as rain, while permitting the photographer to use the camera C and the lens L.

The rain cover 50 is made of water-resistant sheeting. A nylon fabric with a polyurethane coating on the interior and a durable water-resistant (DWR) coating on the outside is currently preferred for the sheeting. The rain cover 50 has, as integrally joined components, a sleeve 60 for the lens L, a cover 55 for the camera C, a sleeve 65 for the right hand of the photographer, and a sleeve 70 for the left hand of the photographer. A zippered opening (not shown in the drawings) in the bottom of the camera cover 55 and the lens sleeve 60. The seams joining these components are preferably stitched seams and are taped for water resistance. The components could be joined in another way, such as by welding or adhesives. The rain cover 50 described thus far has the same general structure as that of rain covers currently on the market, such as Think Tank Photo's HYDROPHOBIA® 300-600 rain cover for a camera and lens.

Figure 10:
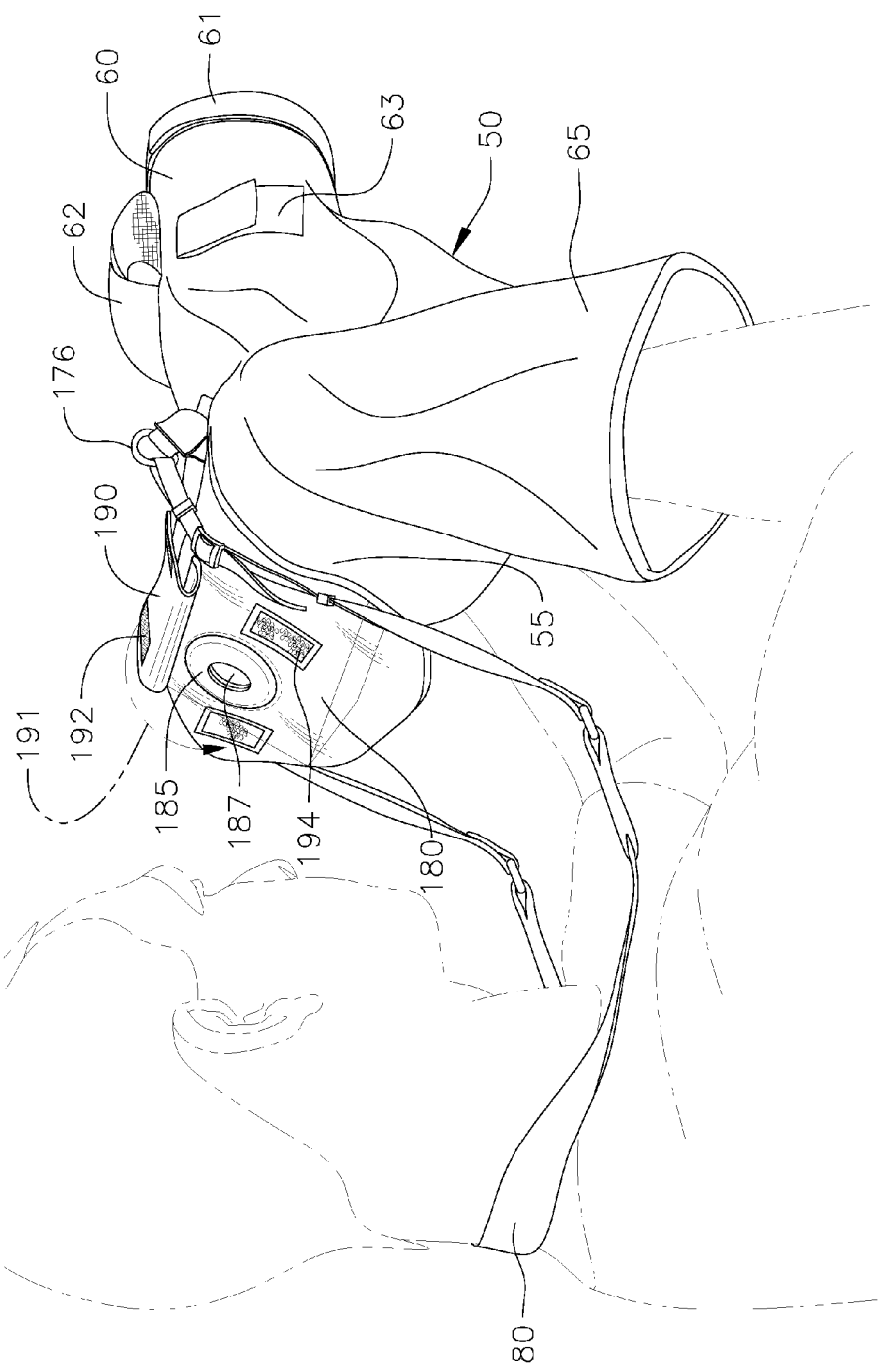
FIG. 10 is a perspective view from the rear of the rain cover for a camera and lens of FIG. 6, shown without an eyepiece.

The sleeve 65 permits the right hand of the photographer to access the controls, battery, and memory cards of the camera C. The sleeve 70 allows the left hand of the photographer to access the lens L and its controls. The photographer may support the camera C and the lens L in his or her hands inserted through the sleeves 65 and 70, as shown in FIG. 10.

The sleeve 60 is secured to the lens L by the strap 61. The strap 61 is attached at one end to the outer end of the sleeve 60, runs through a D-ring at another location on the outer end of the sleeve 60 and is doubled-back and secured to itself using hook and loop fasteners. Typically, the lens L has a hood attached to it in order to protect the outer optical elements of the lens L and the strap 61 will secure the sleeve 60 to the hood attached to the lens. The sleeve 60 also bears a pocket 62 that contains a rain cover for the opening of the hood on the lens L.

The rain cover 50 is provided with a neck or shoulder strap 80 for supporting the camera C, the lens L, and the rain cover 50 from the user's neck or shoulder. The strap 80 is attached to a water-resistant connector 100 attached to the rain cover 50. The connector 100 is in turn connected to a lens support strap system 150 that is secured to the lens L.

Figure 7:
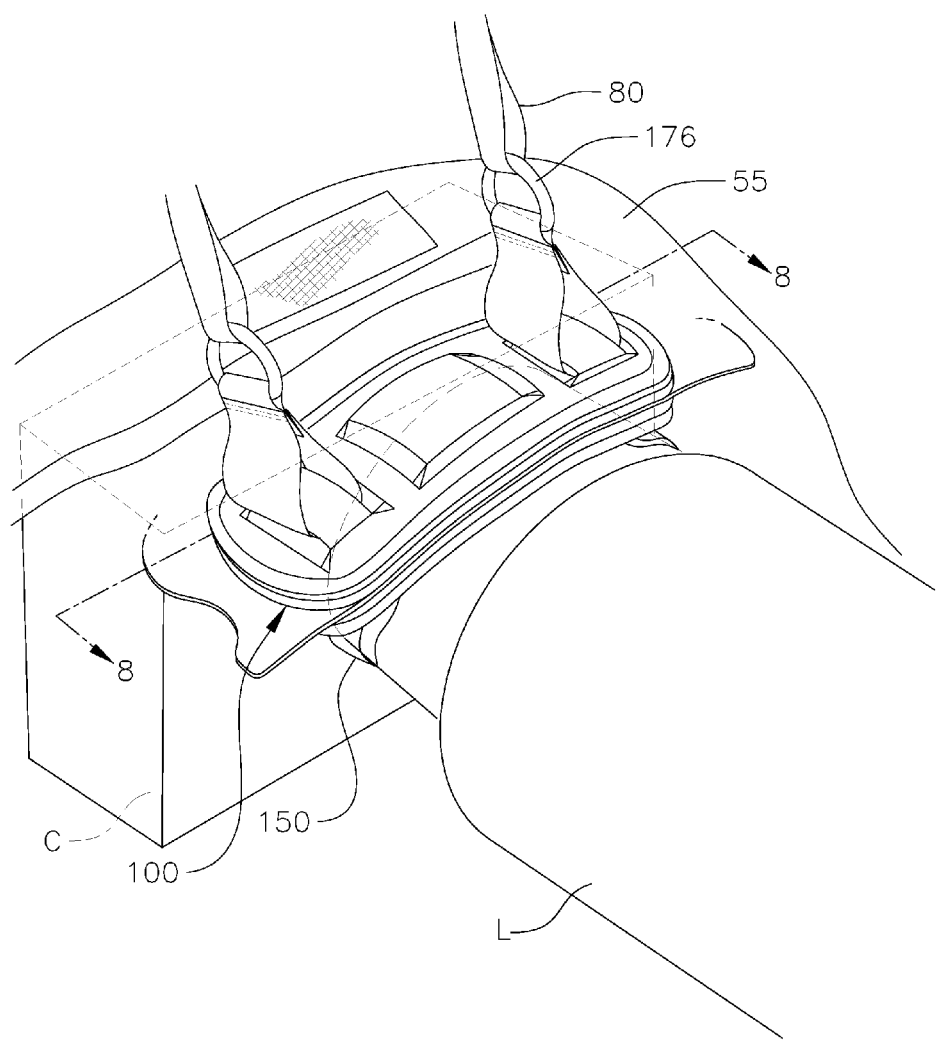
FIG. 7 is a close-up perspective partly cut-away view from above of the water-resistant connection of the rain cover of FIG. 6.
Figure 8:
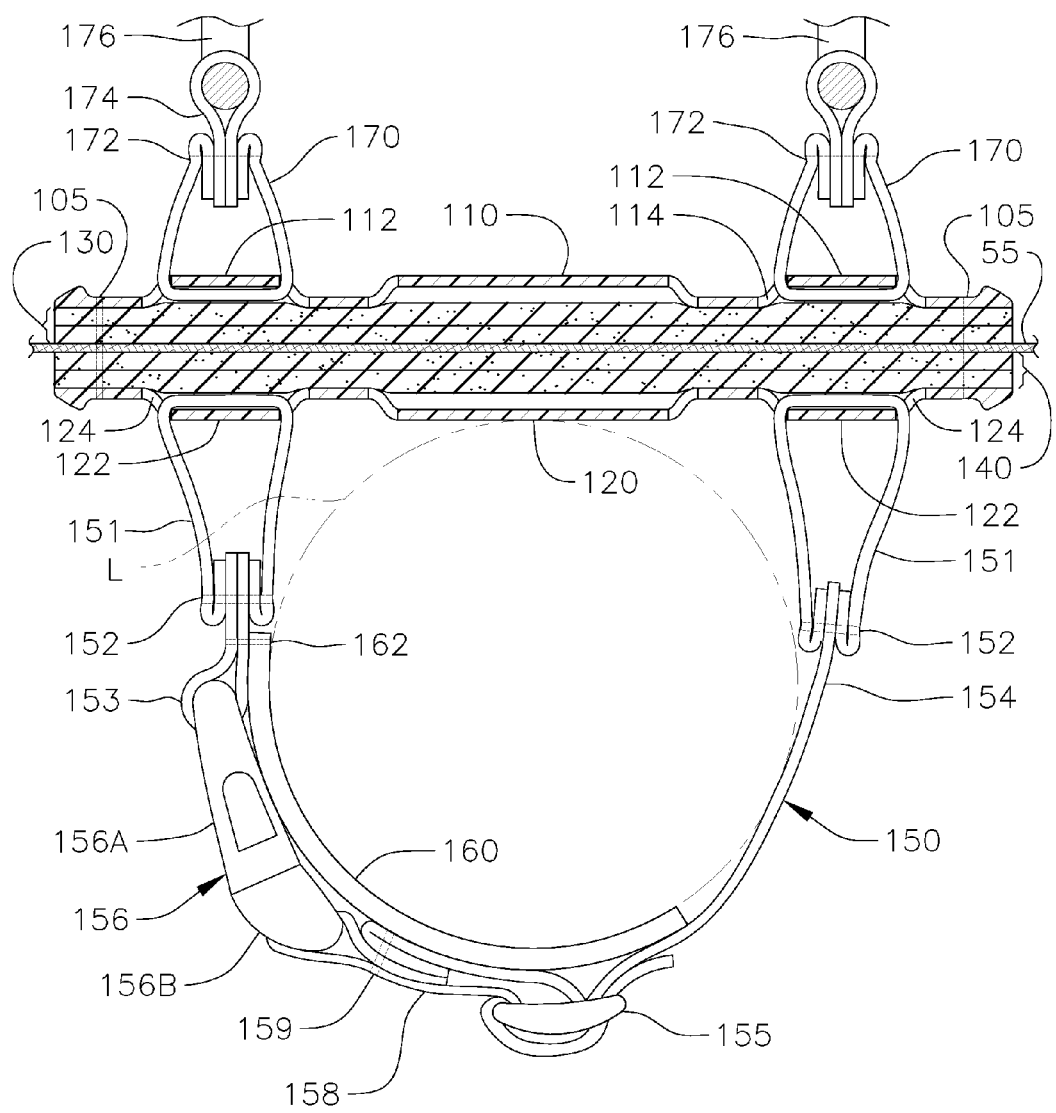
FIG. 8 is a sectional view of the connection of FIG. 7, taken along the plane 8-8 shown in FIG. 7.

The connector 100 is shown in more detail in FIG. 7 and especially the sectional view of FIG. 8. The outer and inner connector plates 110 and 120 are connected by the stitching 105 around a sandwich comprised of the outer gasket 130, the fabric of the camera cover 55, and the inner gasket 140.

The outer and inner connector plates 110 and 120 shown in the drawings are similar in shape and material. The outer connector plate 110 has the slots 114 defined in it on either side of the bridges 112, which permit the outside anchor straps 170 to be threaded through the slots 114 under the bridges 112. The outside anchor straps 170 are connected to the loops 174 by the stitching 172. The loops 174 pass through and secure the rings 176. Each end of the strap 80 is looped through one of the rings 176, and the loop in the strap 80 is secured by the tri-glide 82. The use of the tri-glide 82 to secure the looped end of the neck strap 80 permits the length of the neck strap 80 to be adjusted by the user.

The strap 80 and its means of attachment to the connector 100 could be designed in any of a number of ways. The particular version shown and described in connection with the drawings, although currently preferred, could be altered to use side release buckles or any of a number of connection means.

Figure 9:
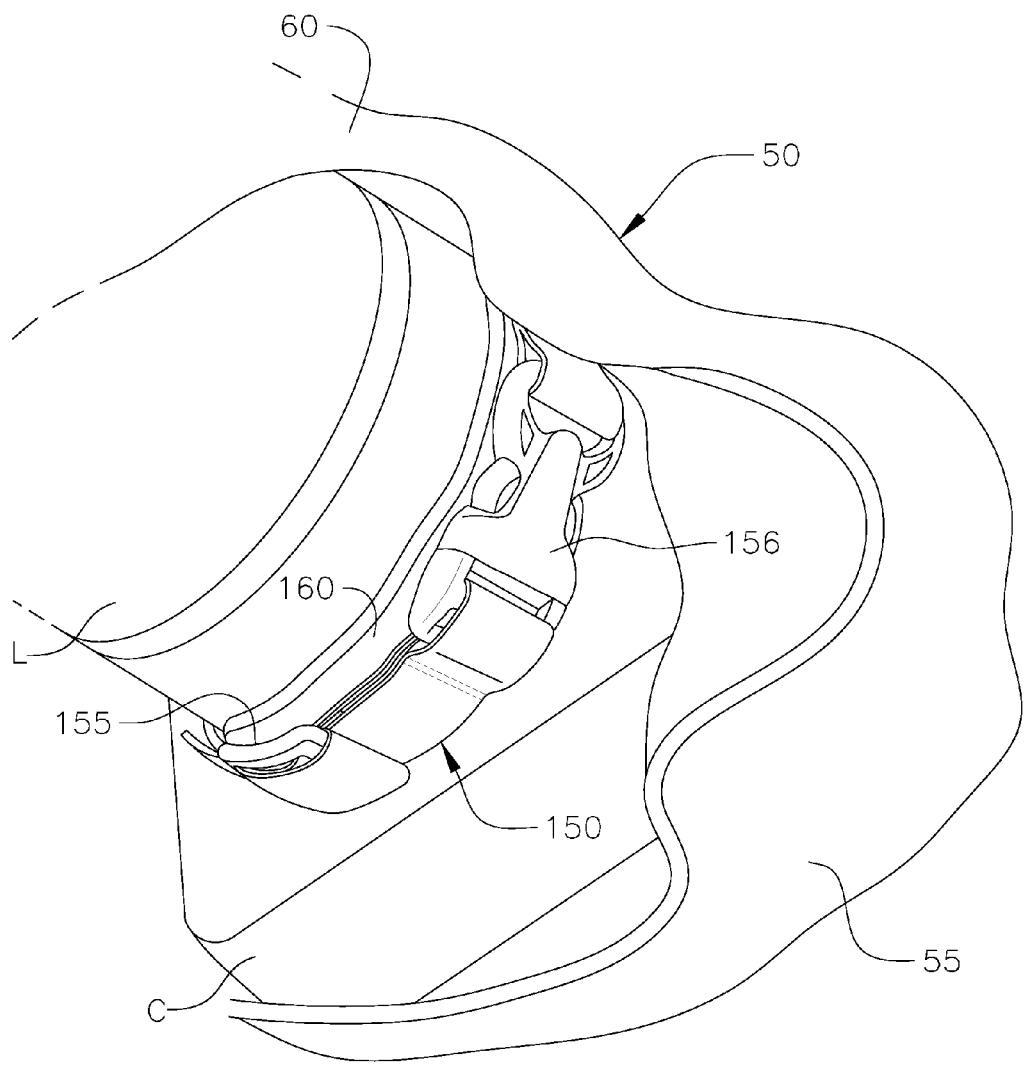
FIG. 9 is a close up perspective partly cut-away view from below of the rain cover of FIG. 6.

The lens support strap system 150 is located underneath the connector 100 and is best seen in FIGS. 8 and 9. The inner connector plate 120 has the slots 124 defined in it on either side of the bridges 122, which permit the inside anchor straps 151 to be threaded through the slots 124 under the bridges 122. One of the inside anchor straps 151 is connected to the strap 154 by the stitching 152 and the other of the anchor straps 151 is connected to the strap 153 by the other of the stitching 152.

The strap 153 loops around an end of the female component 156A of the side release buckle 156. The strap 153 is also sewn to the protective sleeve 160 by means of the stitching 162. The protective sleeve 160 is preferably made of neoprene sheeting and serves as a protective buffer between the side release buckle 156 and the tri-glide buckle 155, which are made of relatively rigid plastic such as polyamide (nylon) or polyoxymethylene (polyacetal), and the lens L.

The strap 154 is looped through the tri-glide buckle 155. The length of the strap 154 from its attachment to the anchor strap 151 to the tri-glide buckle 155 may be adjusted, when not under tension, by sliding the strap 154 through the tri-glide buckle 155. This will permit the lens support strap system 150 to fit itself to lenses of different diameter.

The male component 156B of the side release buckle 156 is connected to the tri-glide buckle 155 by the strap 158. The strap 158 is secured to itself by the stitching 159.

The side release buckle 156 permits the lens support strap system 150 to be unfastened and thus disconnected from the lens L. Once disconnected, the lens support strap system 150 may be adjusted to a lens of different diameter by sliding the strap 154 through the tri-glide buckle 155.

The lens support strap system 150 could be made in a different manner and from different components. For example, hook and loop connection strips could be employed instead of the side release buckle 156 and the tri-glide buckle 155.

The gaskets 130 and 140 preferably are made of the neoprene material and scrim described in connection with FIGS. 4 and 5 and function in the same way as the gaskets 30 and 40 described in connection with FIGS. 1-3. Thus, compression of the gaskets 130 and 140 will make the connector 100 water-resistant despite the challenging situation of having to support the weight of the camera C and lens L across the connector 100.

Prototypes of the rain cover 50 have been constructed and tested for water resistance as follows. In a first test, a portion of the rain cover containing the connector 100 was placed over the top of a bowl and covered with a layer of water. In another test the rain cover was placed over a camera and lens and then exposed to a mist-producing machine in order to simulate a moist, raining environment. In both tests the rain cover prevented the passage of water for at least two hours.

A rain cover with a water-resistant connector for attachment to a neck or shoulder strap as disclosed above could be supplied for equipment other than a camera and lens, such as any equipment that needs protection from moisture and may be supported by a strap such as a neck or shoulder strap. Examples of such equipment are binoculars, telescopes, and Global Positioning System receivers. It will be clear that any number of other types of equipment could be supplied with such covers.

FIG. 10 shows the rear of the rain cover 50. The camera cover 55 comprises a clear or translucent viewing sheet 180 that fits over the back of the camera C. An eyepiece gasket 185 is sewn to the sheet 180 in a position that will place it over the eyepiece of the camera C. The sheet 180 is may be made of thermoplastic polyurethane or polyvinyl chloride or materials with similar characteristics. Polyurethane is preferred because of the toxicity of the process for preparing polyvinyl chloride presents environmental concerns.

The controls and display of the camera C will be visible through it for inspection by the photographer. The viewing sheet 180 has a rain flap 190 attached above it. The rain flap 190 can be rotated over the viewing sheet 180 in the direction shown by the arrow 191 in order to protect the eyepiece gasket 185. In that position it would be secured to the viewing sheet 180 by hook strips 192 and loop strips 194 sewn to, respectively, the rain flap 190 and the viewing sheet 180. The rain flap 190 is preferably made of a water-resistant fabric.

Figure 11:
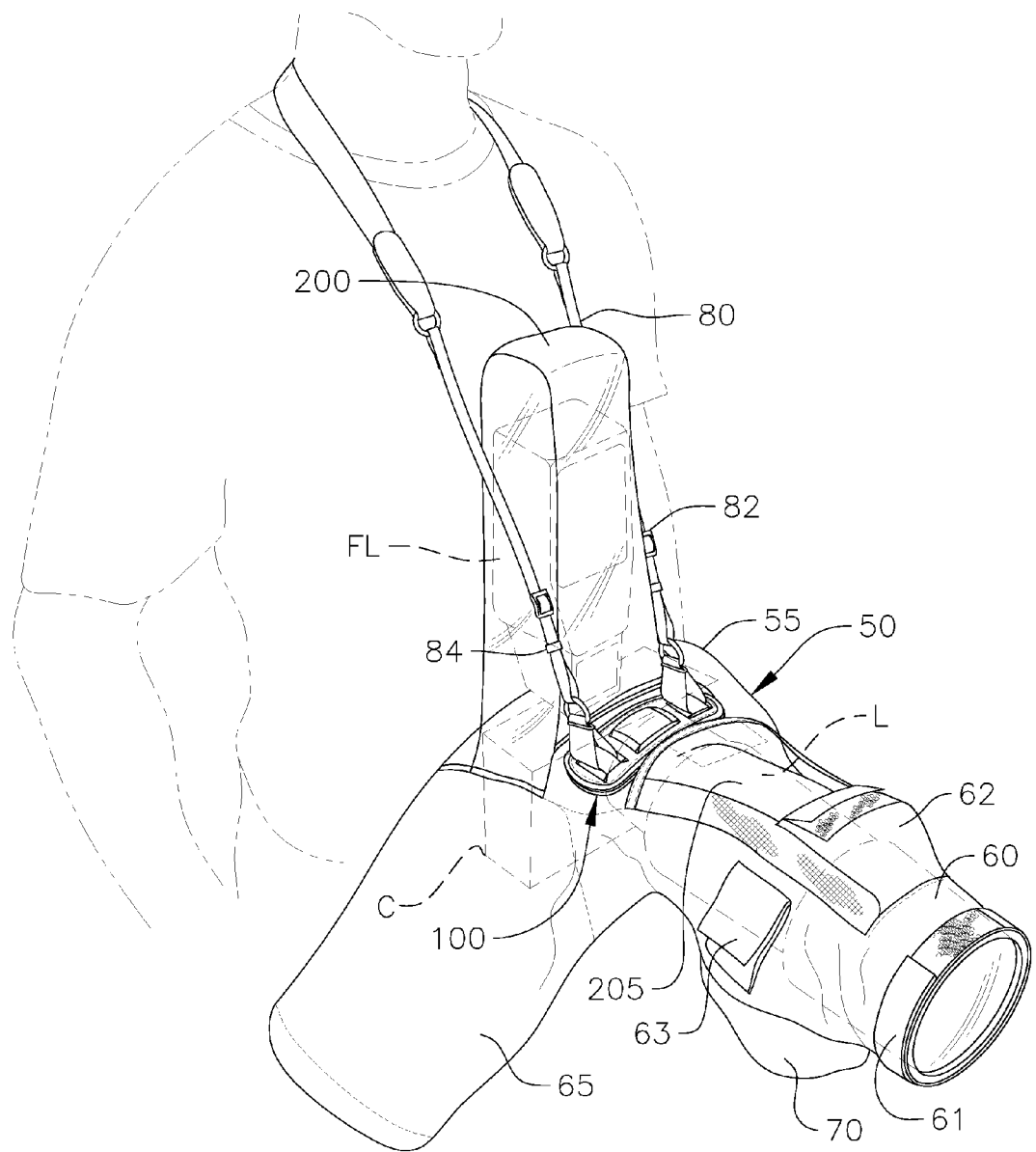
FIG. 11 is a perspective view of a rain cover for a camera, lens, and flash unit according to the invention employing a water-resistant connection according to the invention to attach a shoulder or neck strap and a camera support strap to opposite sides of the same location on the rain cover.
Figure 12:
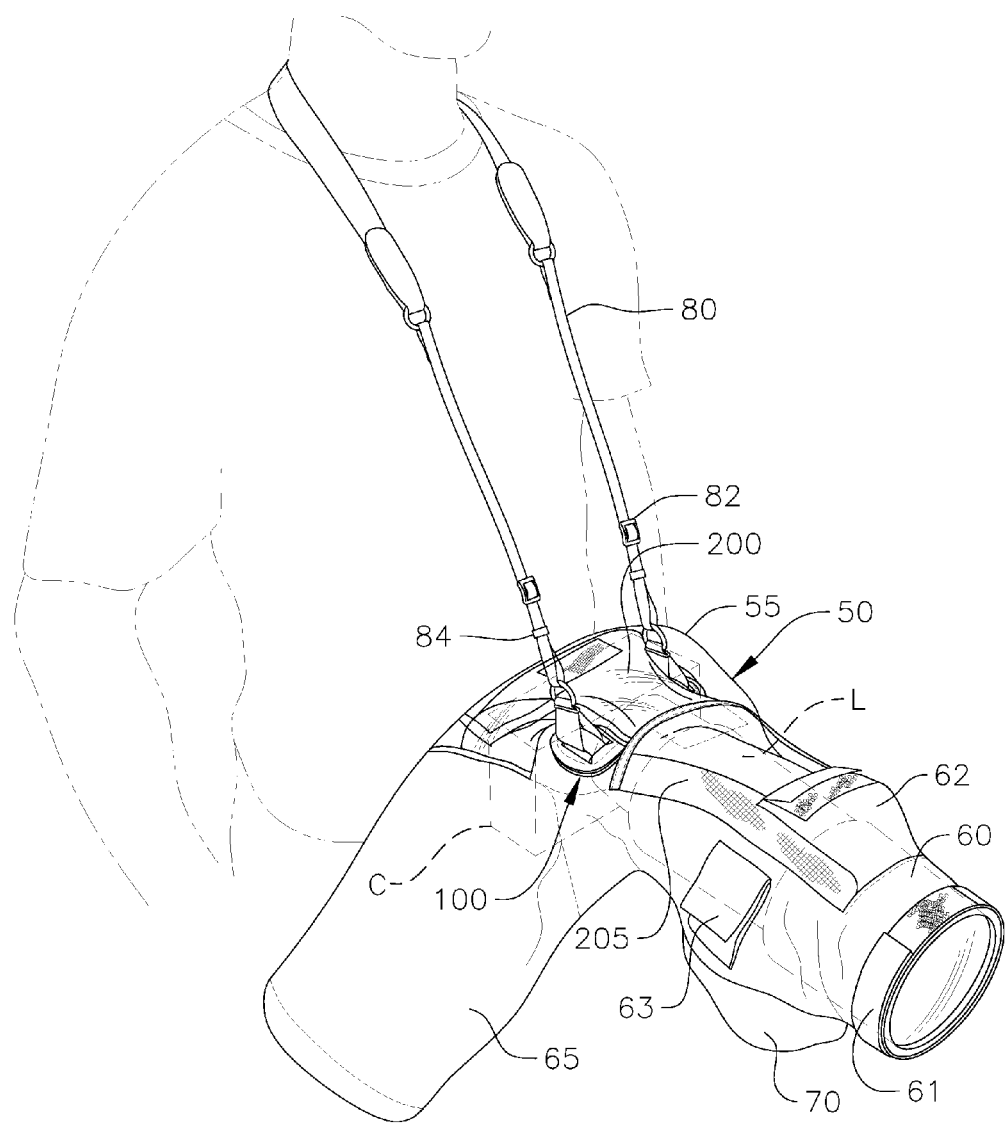
FIG. 12 is a perspective view of the rain cover of FIG. 11 with the flash unit cover shown folded down when the flash unit is detached from the camera body.

FIGS. 11 and 12 depict a variant of the rain cover 50 that includes a clear or transparent flash cover 200 attached to the top of the camera cover 55 in order to accommodate a flash unit FL attached to the top of the camera C. The flash cover 200 is preferably made of thermoplastic polyurethane or polyvinyl chloride or materials with similar characteristics. As noted above, polyurethane is preferred because of the toxicity of the process for preparing polyvinyl chloride presents environmental concerns. The flash cover 200 is sewn to the top of the camera cover 55. The seams between the flash cover 200 and the camera cover 55 preferably are sealed.

FIG. 11 shows the flash cover 200 deployed in the upright position when the flash unit FL is attached to the camera C. In FIG. 12 the flash unit FL has been removed from the camera C and the flash cover 200 has been folded out of the way into the pocket 205 that is attached to the top of the lens hood 60.

Figure 13:
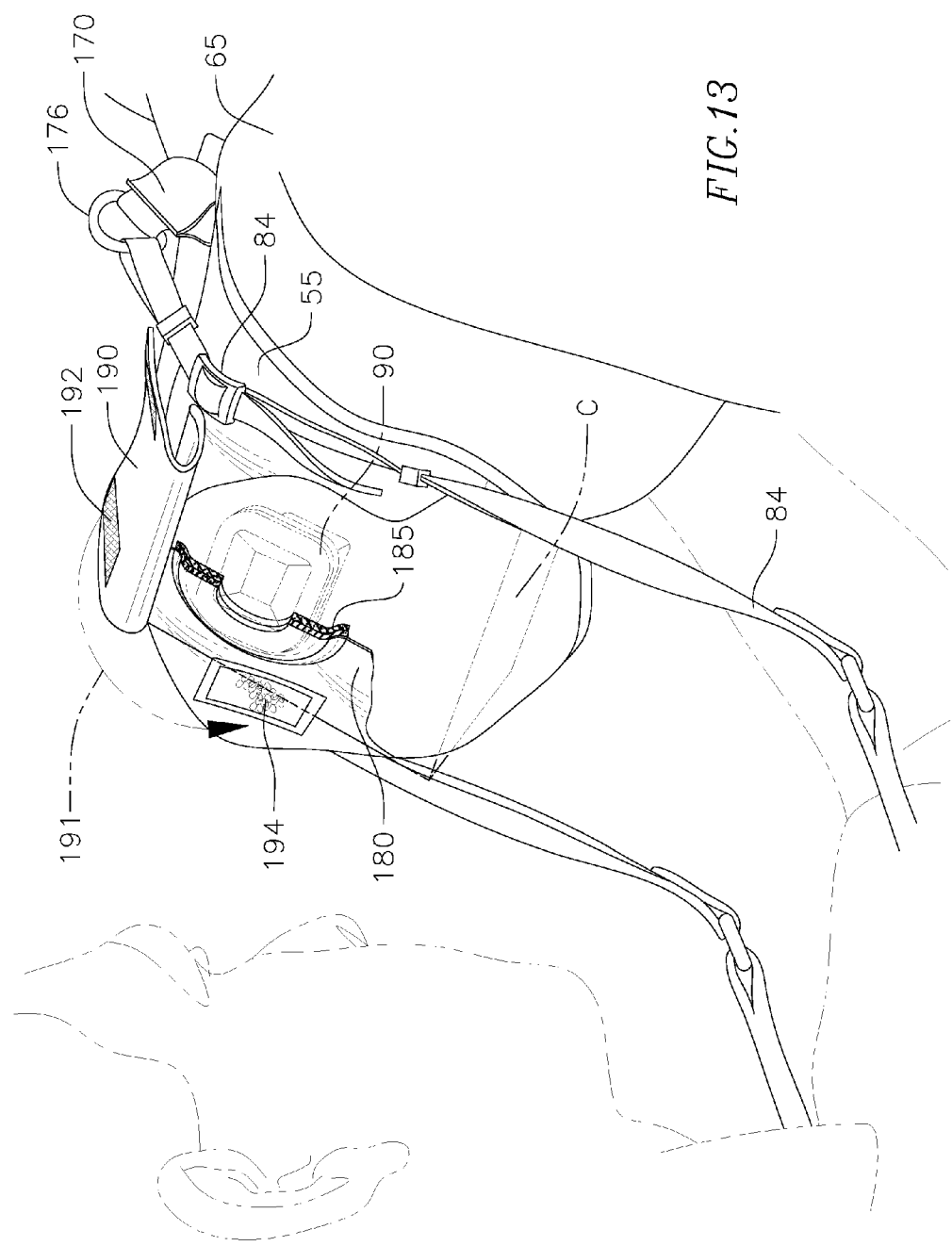
FIG. 13 is a close up perspective partial cut-away view from the rear of the rain cover of FIG. 10, shown with an eyepiece.
Figure 14:
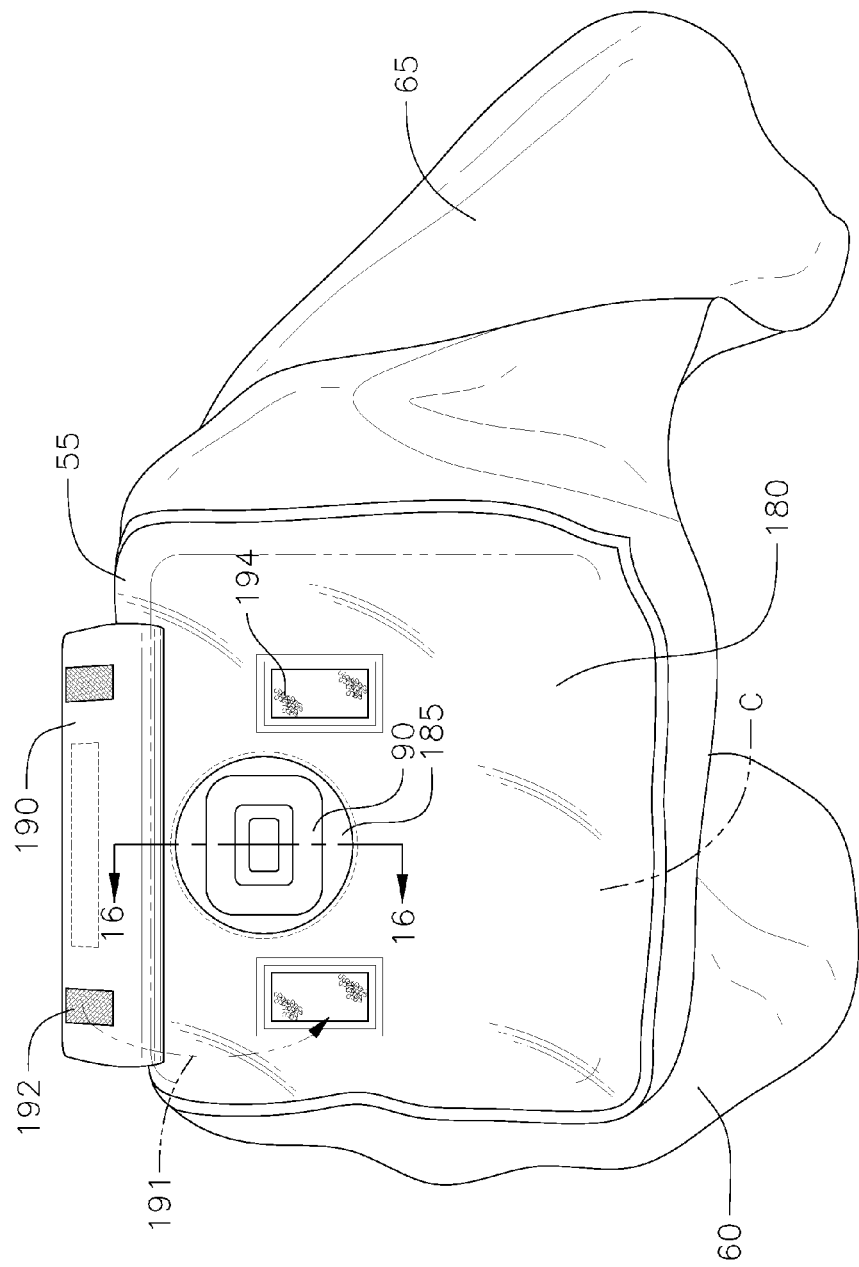
FIG. 14 is a perspective rear view of the rain cover and eyepiece of FIG. 13.

FIGS. 13 and 14 are a close-up of a portion of the back of the rain cover 50 showing the eyepiece 90 inserted through a hole 187 provided in the eyepiece gasket 185. The eyepiece 90 is provided with the rain cover 50 that is designed to cooperate with the rain cover 50. It is designed to replace the eyepiece provided with the camera C. The eyepiece originally provided with the camera C is slid off the camera C and the eyepiece 90 is slid on the camera C in its place. The eyepiece 90 is designed to match the eyepiece mounting system provided by the camera manufacturer. When not attached to the camera C, the eyepiece 90 is enclosed and secured in the pocket 63 attached to the outside of the lens hood 60.

Figure 15:
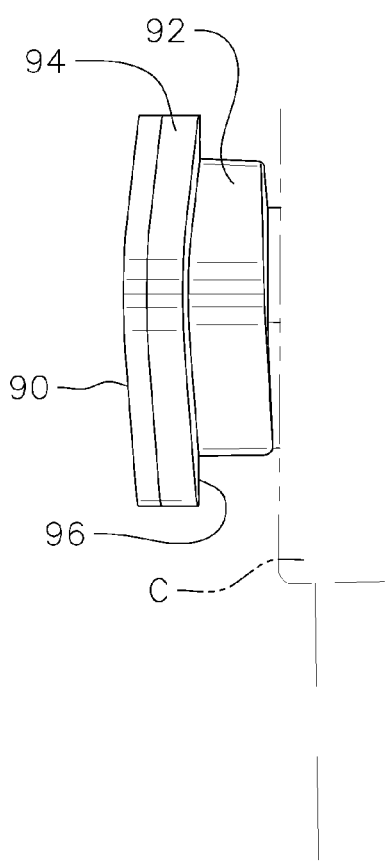
FIG. 15 is a perspective view of the eyepiece of FIG. 13 shown mounted on the camera.
Figure 16:
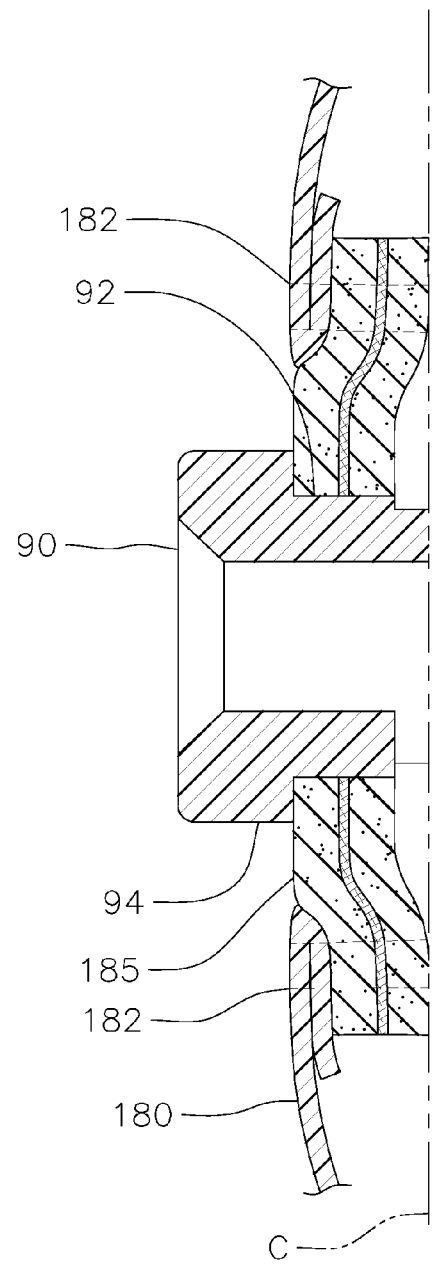
FIG. 16 is a sectional view of the eyepiece and part of the rain cover taken along the plane 16-16 shown in FIG. 15.

FIG. 15 shows the eyepiece 90 mounted on the camera C. The eyepiece 90 has a shaft 92 that is narrower than the face 94. This difference in diameter produces a shoulder 96. As shown in the sectional view 16, the shaft 92 is long enough that the eyepiece gasket 185 will rest against the shaft 92 and under the shoulder 96 when the eyepiece 90 is inserted through the hole 187 in the eyepiece gasket 185.

The gasket 185 preferably is made of the gasket material shown and discussed in connection with FIGS. 4 and 5. It has been found that using a gasket material made of two elastomeric sheets joined to a central scrim provides a seal against the eyepiece shaft 92 that will better resist the penetration of water between the gasket 185 and the shaft 92.

While illustrative embodiments of the devices and methods disclosed herein have been shown and described in the above description, numerous variations and alternative embodiments will occur to those skilled in the art and it should be understood that, within the scope of the appended claims, the invention may be practiced otherwise than as specifically described. Such variations and alternative embodiments are contemplated, and can be made, without departing from the scope of the invention as defined in the appended claims.

The invention claimed is:

1. A rain cover for a camera and lens, comprising:
   a water-resistant hood for the camera and the lens,
   a connector located at a top side of the hood comprising outside and inside plates opposedly disposed outside and inside the hood, a gasket comprised of an elastomeric material disposed between one of the outside and inside plates and the hood, and stitching joining the outside to the inside plates, the stitching passing through the gasket and the hood and tensioned in order to compress the gasket between the one of the outside and inside plates and the hood,
   wherein the outside plate comprises an outside anchor for attachment to a neck or shoulder strap and the inside plate comprises an inside anchor for attachment to at least one of the camera and lens.

2. The rain cover according to claim 1 further comprising a strap attached to the inside anchor, the strap being sized to encircle and attach to the lens.

3. The rain cover according to claim 2 wherein the inside plate comprises two inside anchors and the strap has a first end attached to a one of the inside anchors and a second end attached to an other of the inside anchors.

4. The rain cover according to claim 2 wherein the strap further comprises a buckle whereby the strap may be disconnected from the lens.

5. The rain cover according to claim 1 further comprising a second gasket comprised of an elastomeric material disposed between the other of the outside and inside plates and the hood, wherein the stitching joining the outside to the inside plates, passes through the second gasket and the hood and is tensioned in order to compress the second gasket between the other of the outside and inside plates and the hood.

6. The rain cover according to claim 1 further comprising a transparent sleeve attached to the top of the hood for covering and protecting a flash unit attached to the camera.

7. The rain cover according to claim 1 further comprising a gasket attached to the hood in the vicinity of the eyepiece of the camera, the gasket being made of an elastomeric material and defining a hole;
   wherein an eyepiece having a shaft may be inserted through the hole in the gasket and attached to the camera, the gasket being in close contact with the shaft of the eyepiece.

8. A rain cover for a camera and lens, comprising:
   a water-resistant hood for the camera and the lens,
   a gasket attached to the hood in the vicinity of the eyepiece of the camera, the gasket being made of an elastomeric material and defining a hole;
   wherein an eyepiece having a shaft may be inserted through the hole in the gasket and attached to the camera, the gasket being in close contact with the shaft of the eyepiece;
   and wherein the elastomeric material is comprised of two sheets of an elastomeric material adhered to either side of a scrim sheet.

9. A rain cover for equipment, comprising:
   a water-resistant hood for the equipment,
   a connector located at a top side of the hood comprising first and second plates opposedly disposed outside and inside the hood, a gasket comprised of an elastomeric material disposed between one of the first and second plates and the hood, and stitching joining the first to the second plates, the stitching passing through the gasket and the hood and tensioned in order to compress the gasket between the one of the first and second plates and the hood,
   wherein the first plate comprises an outside anchor for attachment to a support strap and the second plate comprises an inside anchor for attachment to the equipment.

10. The rain cover according to claim 9 further comprising a strap attached to the inside anchor, the strap being sized to encircle and attach to the equipment.

11. The rain cover according to claim 9 wherein the inside plate comprises two inside anchors and the strap has a first end attached to one of the inside anchors and a second end attached to the other of the inside anchors.

12. The rain cover according to claim 11 wherein the strap further comprises a buckle whereby the strap may be disconnected from the equipment.

13. The rain cover according to claim 9 further comprising a second gasket comprised of an elastomeric material disposed between the other of the first and second plates and the hood, wherein the stitching joining the first to the second plates, passes through the second gasket and the hood and is tensioned in order to compress the second gasket between the other of the first and second plates and the hood.

\* \* \* \* \*